United States Patent
Zhang

(10) Patent No.: US 7,927,026 B2
(45) Date of Patent: Apr. 19, 2011

(54) CAMERA MODULE AND PORTABLE ELECTRONIC DEVICE USING SAME

(75) Inventor: Yu Zhang, Shenzhen (CN)

(73) Assignees: Shenzhen Futaihong Precision Industry Co. Ltd., ShenZhen, Guangdong Province (CN); FIH (Hong Kong) Limited, Kowloon (HK)

(*) Notice: Subject to any disclaimer, the term of this patent is extended or adjusted under 35 U.S.C. 154(b) by 0 days.

(21) Appl. No.: 12/624,837

(22) Filed: Nov. 24, 2009

(65) Prior Publication Data

US 2010/0158511 A1   Jun. 24, 2010

(30) Foreign Application Priority Data

Dec. 23, 2008   (CN) .......................... 2008 1 0306485

(51) Int. Cl.
*G03B 17/02* (2006.01)
*H04N 7/14* (2006.01)

(52) U.S. Cl. .................... 396/428; 396/541; 348/14.02; 348/376; 455/556.1

(58) Field of Classification Search .................. 396/428, 396/429, 535, 541; 348/14.02; 455/556.1
See application file for complete search history.

(56) References Cited

U.S. PATENT DOCUMENTS

| | | | |
|---|---|---|---|
| 2005/0049019 A1* | 3/2005 | Lee | 455/575.4 |
| 2005/0054377 A1* | 3/2005 | Yeh | 455/556.1 |
| 2005/0122423 A1* | 6/2005 | Castaneda et al. | 348/373 |
| 2005/0261041 A1* | 11/2005 | Im | 455/575.3 |

* cited by examiner

*Primary Examiner* — W. B. Perkey
*Assistant Examiner* — Dennis Hancock
(74) *Attorney, Agent, or Firm* — Steve M. Reiss

(57) ABSTRACT

A camera module and a portable electronic device using same are provided. The camera module can be rotated to align with a first camera window and a first aperture in the front of the portable electronic device or a second camera window and second aperture in the rear of the portable electronic device.

20 Claims, 6 Drawing Sheets

CAMERA MODULE AND PORTABLE ELECTRONIC DEVICE USING SAME

BACKGROUND

1. Technical Field

The present disclosure relates to camera modules, and particularly to a camera module used in a portable electronic device.

2. Description of Related Art

Camera modules are often provided in portable electronic devices, such as digital cameras, mobile phones, or personal digital assistants, to provide the device with an imaging function (e.g., still and/or video photography). A typical camera module includes a lens barrel and a lens assembly received in the lens barrel. The portable electronic device includes a camera window on its rear surface and a display on its front surface. The camera window is aligned with the lens assembly and allows the outside light to penetrate to the lens assembly for image capture by the camera module. However, it is difficult for a user to take a self-picture while simultaneously observing the image shown on the display.

Therefore, there is room for improvement within the art.

BRIEF DESCRIPTION OF THE DRAWING

Many aspects of the new camera module and portable electronic device using the same can be better understood with reference to the following drawings. The components in the drawings are not necessarily drawn to scale, the emphasis instead being placed upon clearly illustrating the principles of the new camera module and portable electronic device using the same. Moreover, in the drawings, like reference numerals designate corresponding parts throughout the several views.

DETAILED DESCRIPTION

Figure 1:
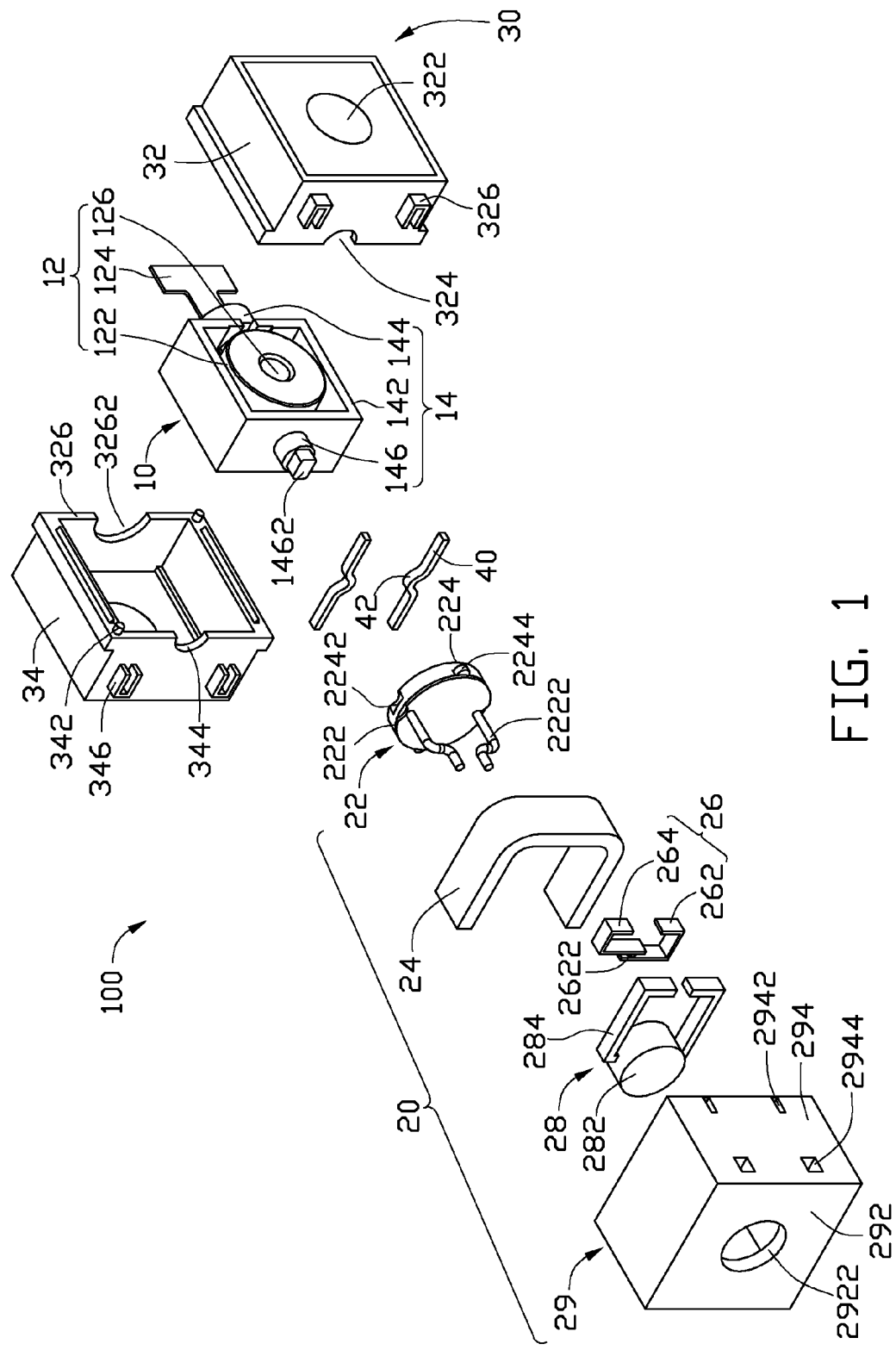
FIG. 1 is an exploded, isometric view of a camera module according to an exemplary embodiment.
Figure 2:
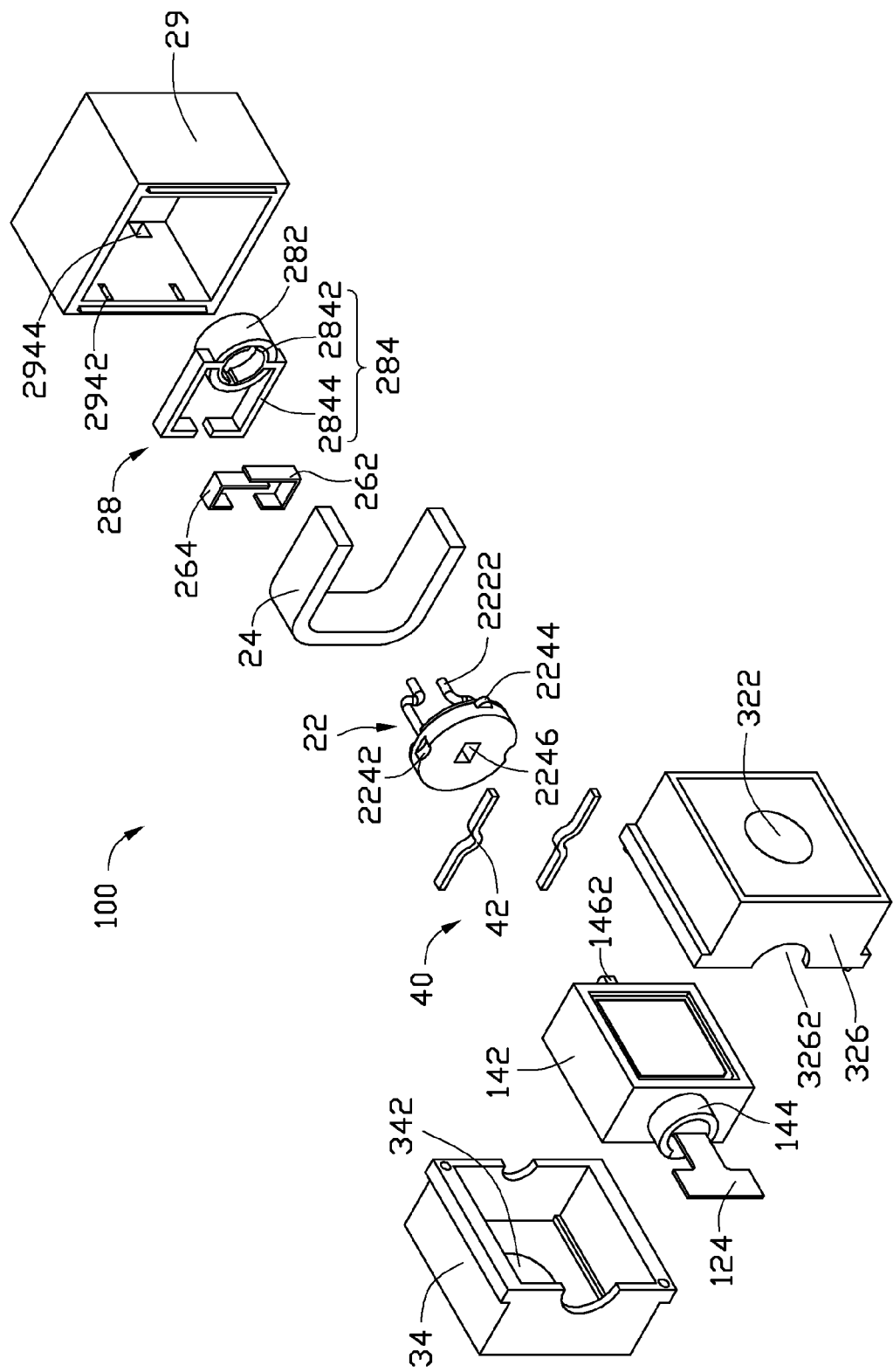
FIG. 2 is similar to FIG. 1 but viewed from another angle.

FIGS. 1 and 2 shows an exemplary camera module 100 including a camera unit 10, a rotary unit 20, a receiving box 30 and two elastic strips 40. The camera unit 10 is rotatably received in the receiving box 30. The rotatable unit 20 is secured to the camera unit 10 on a side and outside of the receiving box 30. The elastic strips 40 are retained between the rotary unit 20 and the receiving box 30.

The camera unit 10 includes an image capturing unit 12 and a securing case 14. The securing case 14 secures the imaging unit 12. The imaging unit 12 includes a lens barrel 122, a flexible printed circuit board 124, and a lens assembly 126. The lens assembly 126 is received in the lens barrel 122. The flexible printed circuit board 124 is rotatably secured to the lens barrel 122. The securing case 14 includes a peripheral wall 142, a sleeve portion 144, and a shaft portion 146. The sleeve portion 144 and the shaft portion 146 protrude from opposite sides of the peripheral wall 142. The sleeve portion 144 is hollow and communicates with the inside of the securing case 14. The flexible printed circuit board 124 passes through the sleeve portion 144, into the securing case 14 and secured in the lens barrel 122. The shaft portion 146 includes a securing portion 1462 for securing the rotary unit 20.

The rotary unit 20 includes a rotary disk 22, a U-shaped magnet 24, a switch 26, an electric brush 28 and a mounting member 29. The rotary disk 22 includes a coil end portion 222 and an insulative base portion 224. The coil end portion 222 includes two electrical terminals 2222. The two electrical terminals 2222 elastically abut the electric brush 28. The insulative base portion 224 defines two notches 2242 and two projections 2244 on its periphery. The two notches 2242 and the two projections 2244 are arranged in an alternating order and orthongally on its periphery correspondingly. The elastic strip 40 has a curved portion 42 formed at the middle engageable in the notch 2242. The projections 2244 alternately abut the switch 26. The insulative base portion 224 defines securing slot 2246 in the center (shown in FIG. 2). The securing slot 22 has substantially the same size and shape as the securing portion 1462. The securing portion 1462 is secured in the securing slot 22.

The switch 26 includes a first metallic sheet 262 and a second metallic sheet 264. The first metallic sheet 262 and the second metallic sheet 264 are bent and oppositely arranged. The first metallic sheet 262 has a protrusion 2622 facing the second metallic sheet 264. The protrusion 2622 touches the second metalic sheet 262 when the first metallic sheet 262 is pressed.

The electric brush 28 includes a cylindrical, hollow base portion 282 and two opposite brush portions 284. Each brush portion 284 includes a securing end 2842 and an L-shaped brush end 2844. The brush end 2844 connects the securing end 2842. The brush portions 284 are secured to the base portion 282 by securing of the securing ends 2842 to the interior wall of the base portion 282.

The mounting member 29 has the rotary disk 22, the magnet 24, the switch 26 and the electric brush 28 mounted therein. The mounting member 29 includes an end wall 292 and a sidewall 294. The end wall 292 defines a circular hole 2922 having substantially the same size and shape as the base portion 282. The circular hole 2922 receives the base portion 282. The sidewall 294 defines two first latch slots 2942 and two second latch slots 2944. The first latch slots 2942 has the switch 26 secured (shown in FIG. 4). The second latch slots 2944 secure the brush portions 284 of the electric brush 28 (shown in FIG. 4).

The receiving box 30 receives the camera unit 10 and includes a first box section 32 and a second box section 34. The first box section 32 and the second box section 34 have generally the same structures. The first box section 32 defines a first aperture 322 to receive light into the receiving box 30. The second box section 34 defines a second aperture 342 aligned with the first aperture 322 and also allowing outside light to penetrate into the receiving box 30. The first box section 32 defines two semi-circular, opposite first cutouts 324. Accordingly, the second box section 34 defines two semi-circular, opposite second cutouts 344. The first cutouts 324 are aligned with the second cutouts 344. When the first box section 32 is attached to the second box section 34, the first cutouts 324 and the second cutouts 344 cooperatively define two circular spaces. The circular spaces rotatably receives the sleeve portion 144 and the shaft portion 146.

The first box section 32 further includes two vertically aligned first clamp portions 326. The second box section 34 further includes two vertically aligned second clamp portions 346. The first clamp portions 326 and the second clamp portions 346 have generally the same structures, i.e., generally U-shaped. When the first box section 32 is attached to the second box section 34, the first clamp portions 326 and the second clamp portions 346 are horizontally aligned with each other. Each first clamp portion 326 and the second clamp portion 346 coopertively clamp the two opposite ends of the elastic strip 40.

Figure 3:
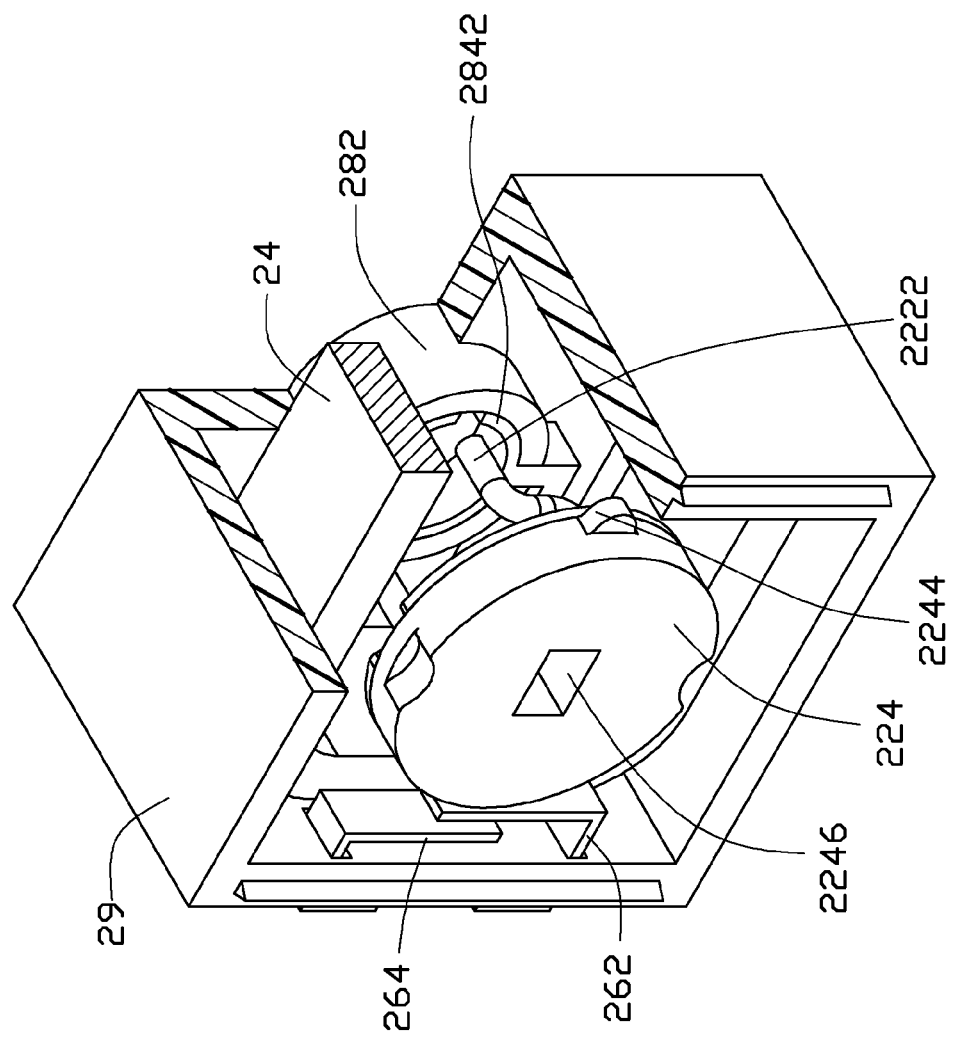
FIG. 3 is a cut-away view of part of the camera module at an assembled position shown in FIG. 1.
Figure 4:
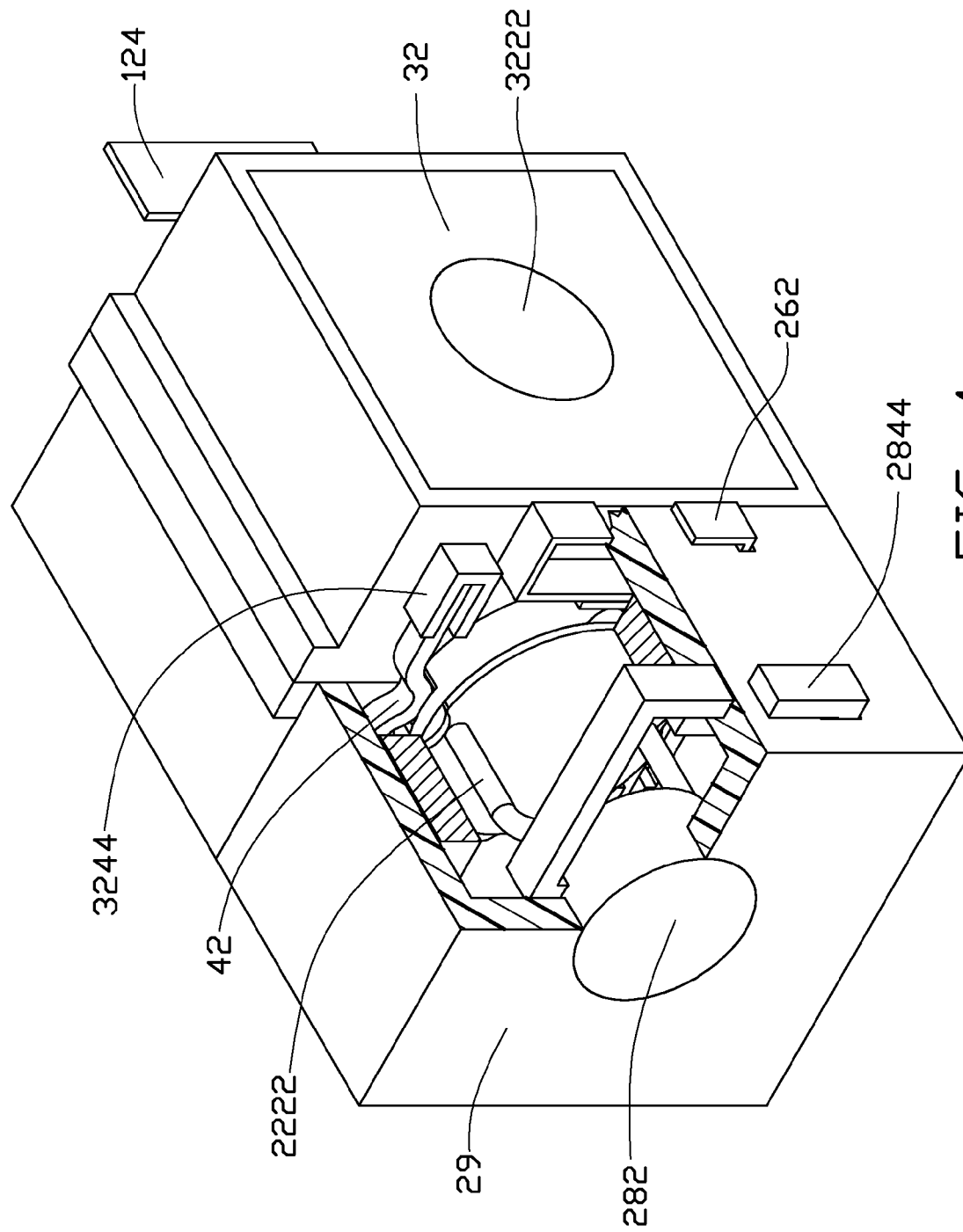
FIG. 4 is another cut-away view of the camera module at an assembled position shown in FIG. 1.

FIG. 3 and FIG. 4 show an assembled camera module 100. The camera unit 10 is secured to the rotary disk 22 by a securing of the securing portion 1462 into the securing slot 2246. The camera unit 10 is received in the receiving box 30 and can be rotated to align the lens assembly 126 with one of the first aperture 322 and the second aperture 342. Each of the elastic strips 40 is secured by the first clamp portion 326 and the second clamp portion 346. The curved portions 42 engage in the notches 2242 of the insulative base portion 224.

The switch 26 is secured in the mounting member 29 by latching the first metallic sheet 262 and the second metallic sheet 264 in the first latch slots 2942. The electric brush 28 is secured in the mounting member 29 by latching of the brush ends 2844 in the second latch slots 2944. The base portion 282 engages in the circular hole 2922 of the mounting member 29. The magnet 24 is fixedly positioned inside the mounting member 29 between the electric brush 28 and the switch 26. The mounting member 29 is attached to the receiving box 30. The electrical terminals 2222 of the rotary disk 22 extend in the base portion 282 of the electric brush 28 and abut the securing ends 2842.

At this assembled state, the projection 2244 of the rotary disk 22 resists the first metallic sheet 262. Hence, the protrusion 2622 contacts the second metallic sheet 264 and the switch 26 is an open state (non-conductive).

Figure 5:
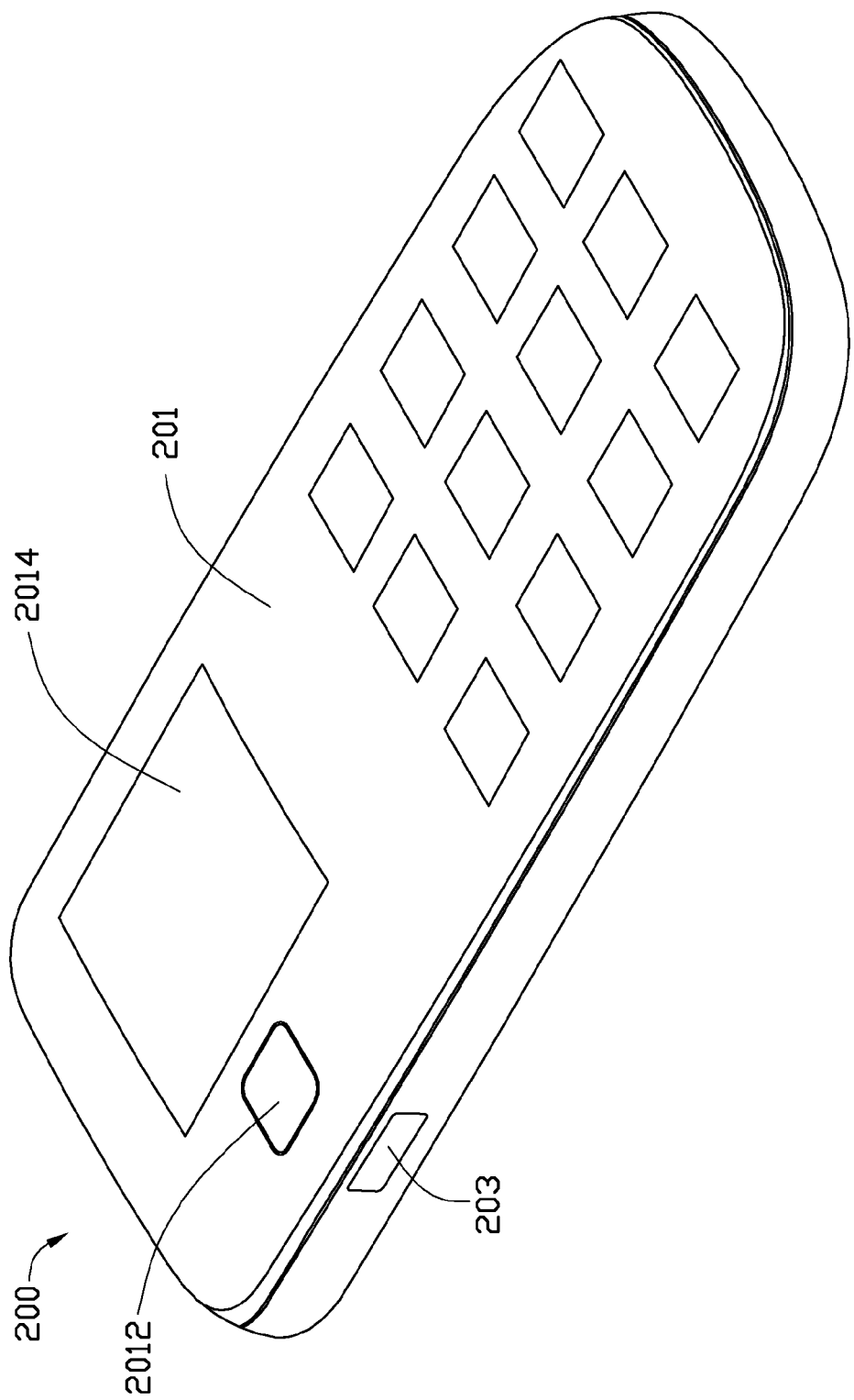
FIG. 5 is an isometric view of an exemplary portable electronic device using the camera module shown in FIGS. 1 through 4.
Figure 6:
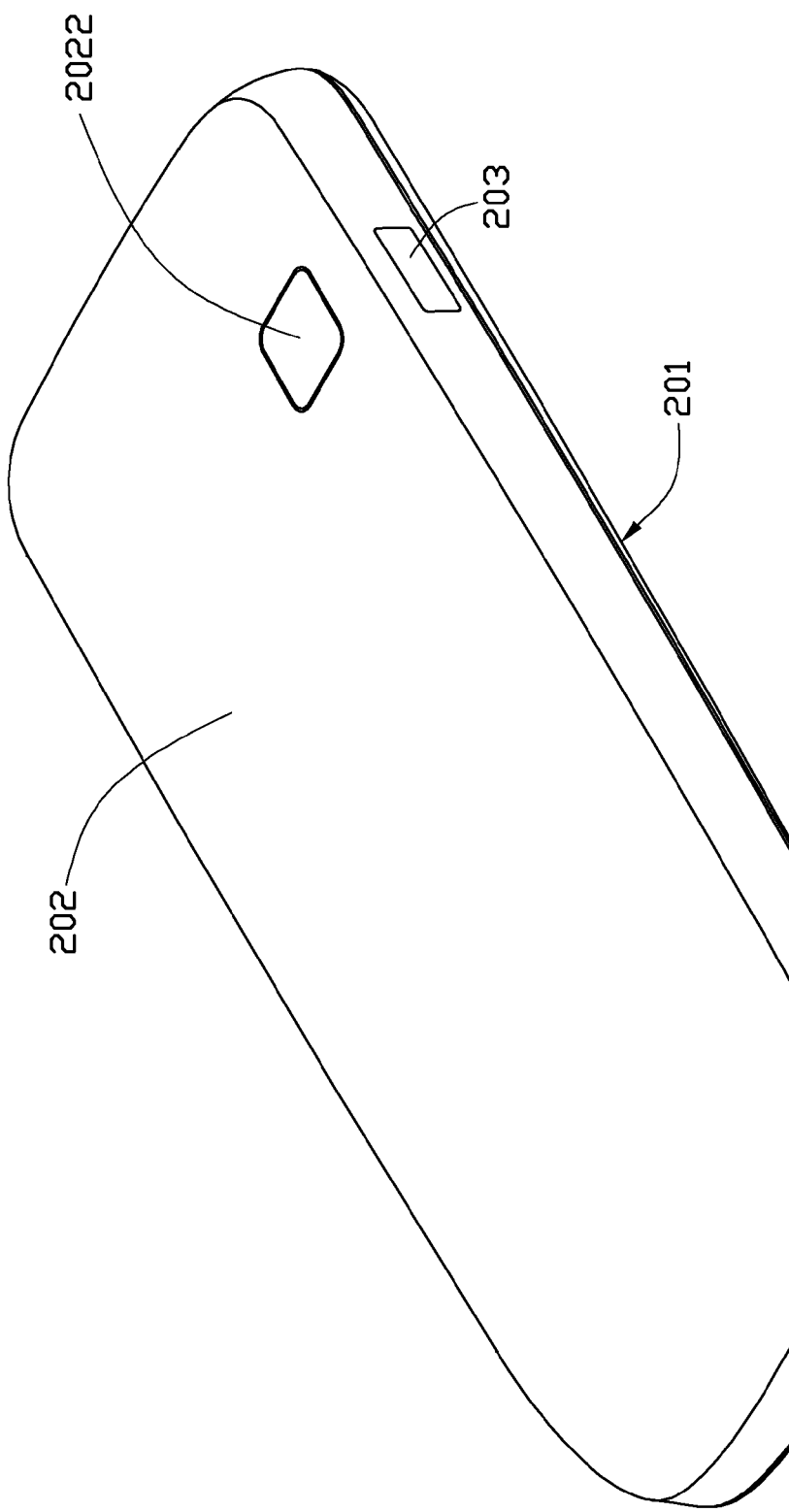
FIG. 6 is similar to FIG. 5 but viewed from another angle.

FIGS. 5 and 6 show an application of the camera module 100 in a portable electronic device 200. The portable electronic device 200 includes a front housing 201 and a rear housing 202. The front housing 201 has a first camera window 2012 and a display 2014. The rear housing 202 has a second camera window 2022 aligned opposite to the first camera window 2012. The rear housing 202 has a button 203 at its side. The button 203 can be pressed enabling the brush portions 284 to be electrically conductive (see below).

During assembly, the camera module 100 is assembled inside the portable electronic device 200. The first box section 32 is secured to the front housing 201, and the second box section 34 is secured to the rear housing 202. The first aperture 322 of the receiving box 30 is aligned with the first camera window 2012 and the second aperture 342 of the receiving box 30 aligns with the second camera window 2022.

In use, when the lens assembly 126 aligns the first aperture 322, the light can pass through the first camera window 2012 and the first aperture 322 into the lens assembly 126. The user can take a self-portrait while viewing the image shown on the display 2014. The button 203 and the brush portions 284 are electrically connected to an inernal circuit of the portable electronic device 200. Pressing button 203 can cause the brush portions 284 to become electrically conductive via the electrical conduction of the internal electronic circuit. Due to the electrical conduction of the brush portions 284 and positioning of the brush portions 28 within the fixed magnetic field of the magnet 24, the stationary magnet 24 provides a rotational force to the coil end portion 222. The rotary disk 22 and the camera unit 10 are rotated by the rotational force.

During the rotation, the projection 2244 disengages from the first metallic sheet 262. The curved portion 42 disengages from the notch 2242. The switch 26 is in an open state. When the rotary disk 22 rotates 180 degrees, another projection 2244 resists the first metallic sheet 262 to close/change the switch to the closed state. The brush portions 284 are accordingly switched to be non-conductive. At this case, the rotation of the rotary disk 22 is stopped. Another curved portion 42 engages into the notch 2242. The lens assembly 126 is aligned with the second aperture 342, thus, light can pass through the second camera window 2022 and the second aperture 342 into the lens assembly 126.

It is to be understood, however, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A camera module, comprising:
   a camera unit;
   a mounting member;
   an electric brush secured in the mounting member;
   a rotary disk fixed to the camera unit and electrically the electric brush;
   a switch configured for switching conductive and nonconductive states of the electric brush; and
   a magnet fixedly positioned inside the mounting member and between the electric brush and the switch, the magnet providing a rotational force to rotate the rotary disk and the camera unit when the electric brush is made electrically conductive by the switching of the switch, the rotation of the rotary disk and the camera unit can be stopped by another switching of the switch.

2. The camera module as claimed in claim 1, wherein the camera unit comprises a shaft portion, the rotary disk defines a securing slot at the center, the shaft portion fixed in the securing slot.

3. The camera module as claimed in claim 1, wherein:
   the camera unit comprising an elastic strip, a first clamp portion and a second clamp portion;
   the elastic strip secured by the first clamp portion and the second clamp portion;
   the rotary disk defines a notch, the curved portion engaging in the notch.

4. The camera module as claimed in claim 1, wherein:
   the switch comprises a first metallic sheet and a second metallic sheet;
   the first metallic sheet and the second metallic sheet are bent and oppositely arranged; and
   the first metallic sheet has a protrusion facing the second metallic sheet.

5. The camera module as claimed in claim 4, wherein the rotary disk comprising two opposite projections on its periphery, the projections alternatively resist against the first metallic sheets during the rotation of the rotary disk, enabling the protrusion connecting or disconnecting with the second metallic sheet.

6. The camera module as claimed in claim 5, wherein the rotary disk comprises a coil end portion, the coil end portion comprises two electrical terminals elastically abutting the electric brush.

7. The camera module as claimed in claim 1, wherein:
   the electric brush comprises a hollow base portion and two opposite brush portions secured to the base portion;
   each brush portion comprises a securing end and a brush end connecting the securing end;
   the base portion engages the mounting member, the electrical terminals electrically abuts the securing ends.

8. The camera module as claimed in claim 7, wherein:
the mounting member defining a circular hole receiving the base portion and comprises a sidewall;
the sidewall defining two first latch slots and two second latch slots;
the first latch slots latch the switch, and the second latch slots latch the electric brush.

9. The camera module as claimed in claim 1, wherein:
the camera unit comprises a first box section and a second box section, the first box section defines a first aperture, the second box section defines a second aperture aligning with the first aperture;
the camera unit further comprises an imaging unit and a securing case, the imaging unit includes a lens barrel and a lens assembly, the lens assembly held by the lens barrel and rotated to alternatively align with the first aperture or the second aperture according to rotation of the rotary disk.

10. The camera module as claimed in claim 9, wherein: the securing case has a shaft portion extending, the rotary disk defines a securing slot at the center, the shaft portion fixed in the securing slot.

11. A portable electronic device, comprising:
a front housing comprising a first camera window;
a rear housing comprising a second camera window opposite to the first camera window and a button; and
a camera module secured in and located between the front housing and the rear housing, the camera module comprising:
a camera unit;
a mounting member;
an electric brush secured in the mounting member, the button configured for being pressed and enabling the electric brush to become electrically conductive;
a rotary disk fixed to the camera unit and electrically abutting the electric brush;
a switch configured for switching conductive and nonconductive states of the electric brush; and
a magnet fixedly positioned inside the mounting member and between the electric brush and the switch, the magnet providing a rotational force to rotate the rotary disk and the camera unit when the electric brush is made electrically conductive by the switching of the switch, the rotation of the rotary disk and the camera unit can be stopped by another switching of the switch, where the camera unit alternatively aligning with the first camera window and the second camera window.

12. The portable electronic device as claimed in claim 11, wherein the camera unit comprises a shaft portion, the rotary disk defines a securing slot at the center, the shaft portion fixed in the securing slot.

13. The portable electronic device as claimed in claim 11, wherein:
the camera unit comprising an elastic strip, a first clamp portion and a second clamp portion;
the elastic strip secured by the first clamp portion and the second clamp portion;
the rotary disk defines a notch, the curved portion engaging in the notch.

14. The portable electronic device as claimed in claim 11, wherein:
the switch comprises a first metallic sheet and a second metallic sheet;
the first metallic sheet and the second metallic sheet are bent and oppositely arranged; and
the first metallic sheet has a protrusion facing the second metallic sheet.

15. The portable electronic device as claimed in claim 14, wherein the rotary disk comprising two opposite projections on its periphery, the projections alternatively resists against the first metallic sheets during the rotation of the rotary disk, enabling the protrusion connecting or disconnecting with the second metallic sheet.

16. The portable electronic device as claimed in claim 15, wherein the rotary disk comprises a coil end portion, the coil end portion comprises two electrical terminals elastically abutting the electric brush.

17. The portable electronic device as claimed in claim 11, wherein:
the electric brush comprises a hollow base portion and two opposite brush portions secured to the base portion;
each brush portion comprises a securing end and a brush end connecting the securing end;
the base portion engages the mounting member, the electrical terminals electrically abuts the securing ends.

18. The portable electronic device as claimed in claim 17, wherein:
the mounting member defining a circular hole receiving the base portion and comprises a sidewall;
the sidewall defining two first latch slots and two second latch slots;
the first latch slots latch the switch, and the second latch slots latch the electric brush.

19. The portable electronic device as claimed in claim 11, wherein:
the camera unit comprises a first box section and a second box section, the first box section defines a first aperture, the second box section defines a second aperture aligning with the first aperture;
the camera unit further comprises an imaging unit and a securing case, the imaging unit includes a lens barrel and a lens assembly, the lens assembly held by the lens barrel and rotated to alternatively align with the first aperture or the second aperture according to rotation of the rotary disk.

20. The portable electronic device as claimed in claim 19, wherein: the securing case has a shaft portion extending, the rotary disk defines a securing slot at the center, the shaft portion fixed in the securing slot.

* * * * *